WILLIAM LEIGHTY, OF EBENSBURG, PENNSYLVANIA.

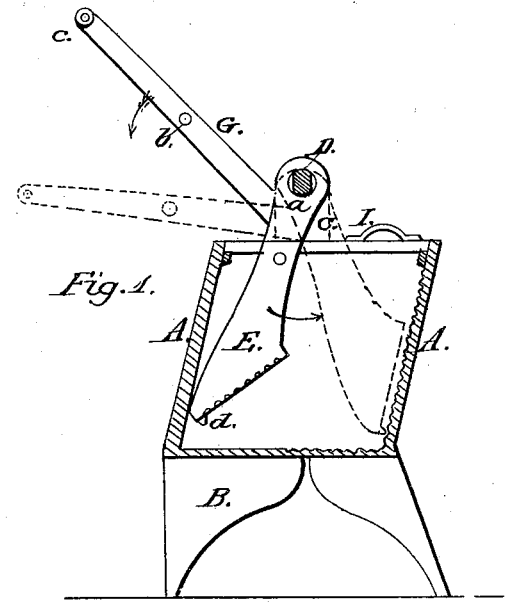
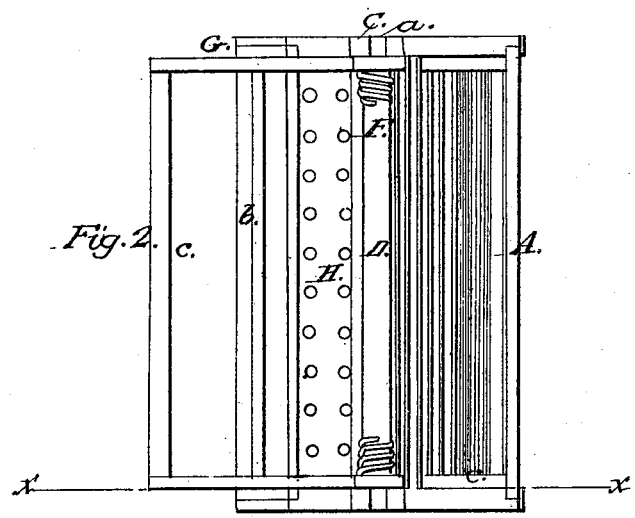

Letters Patent No. 85,942, dated January 19, 1869.

IMPROVED WASHING-MACHINE.

The Schedule referred to in these Letters Patent and making part of the same.

*To all whom it may concern:*

Be it known that I, WILLIAM LEIGHTY, of Ebensburg, in the county of Cambria, and State of Pennsylvania, have invented certain new and useful Improvements in Washing-Machines; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to washing-machines, and consists in a certain novel construction and arrangement of the parts of the machine, by which convenience in operating and thoroughness of work are secured.

In the drawings—

Figure 1 is a transverse vertical section on the line x-x of fig. 2, and

Figure 2 is a top plan view with the cover removed.

In washing-machines, it is important to have the parts operating directly upon the fabrics to be washed, so constructed and arranged that they will neither tear nor unnecessarily wear them.

I construct an oblong box, A, of any size desired, and with its sides parallel and inclined to a horizontal plane, and mount it on legs, B, of any suitable form, all as shown in fig. 1.

The interior surface of the front and bottom of the box A, I flute or corrugate, as shown in the same figure.

In short uprights, C, either rigidly connected to or forming a continuation of the ends of the box A, I mount a shaft, D, so that it cannot turn in its bearings, and yet, when desired, can be conveniently lifted from them, as shown in figs. 1 and 2.

In the upper ends of the uprights C, are sockets, a, with plane vertical sides, and the ends of the shaft D are shaped so as to fit into them, and be removed from them. This arrangement does not allow the shaft D to turn, while it admits of its being conveniently removed when desired.

On the shaft D, and just within its bearings, in the upright, C, I place arms, E, shaped as shown in fig. 1.

These arms E fit loosely on the shaft D, but are connected to it by coiled springs F, one end of the coiled springs being attached to the arms, and the other, after passing several times about the shaft, so as to form the springs, being attached to the shaft, as shown in fig. 2, and so as to hold the arms in the position shown in fig. 1.

To the arms E, and just below their journals, through which the shaft C passes, I rigidly connect the lever-arms G, as shown in figs. 1 and 2, and between the outer ends of the lever-arms G, I place a handle, c, so as to turn in its bearings, for convenience in operating the machine, and also between them, but further from their ends, a brace-bar, b, for stiffening them, as shown in fig. 2.

The lower ends of the arms E are shaped so that the line of their front lower sides will form an angle with the radii of the circle, in the arc of which the arm E swings, and so that when swung over to the front side of the box A, they will be parallel with it, as shown by the red lines in fig. 1.

To these front sides of the lower ends of the arms E, I attach rigidly the wash-board H, perforated, as shown in fig. 2, and having its face corrugated, as shown in fig. 1, and provided, at its extreme lower side, with a projecting lip, d, to prevent its being pressed too close against the front side of the box, but mainly to catch and carry forward the fabrics being washed over the corrugations at the bottom, and against those in the front side.

The board H, when attached to the inclined edges of the arms E, will form an angle with the radii of the arc of the circle in which the arms E move, and in carrying the fabrics forward, will roll them along the corrugations on the bottom of the box, and give them a uniform pressure against the corrugations on its inclined front.

The backward and forward movements of the arms E are limited by the blocks e, attached to the ends of the inside of the box, as shown in fig. 2.

The top of the box A, I provide with a movable cover, I.

In operating my washing-machine, I place the fabrics within the box, and in front of the board H, with such quantity of soap and hot water as may be desired; then place on the cover I, and press the lever-arms G in the direction of the dash-arms. This throws the arms E forward, rubs and rolls the fabrics over the corrugations on the bottom, and up against those on the front of the box. As soon as the pressure ceases, the coiled springs F carry the arms E back again, and in this way the process is carried on till the washing is completed, when the fabrics may be removed and others put in.

I do not claim the arrangement of the dash-board H and arms E, nor the coiled springs F *per se;* but having thus described my invention,

What I claim, is—

1. The method of attaching the coiled springs F to the shaft D and rigidly-connected arms G E, whereby the dasher H, with its connections, may all be removed at the same time, substantially as described.

2. A washing-machine, consisting of the box A, stationary shaft D, having mounted loosely thereon, and connected to it by coiled springs F, the rigidly-connected arms G and E, the latter with the perforated and corrugated dash or wash-board H attached, all constructed and arranged as herein described.

Witnesses:           WILLIAM LEIGHTY.
  DANIEL O. EVANS,
  WILLIAM CLEMENT.